Figure 1:
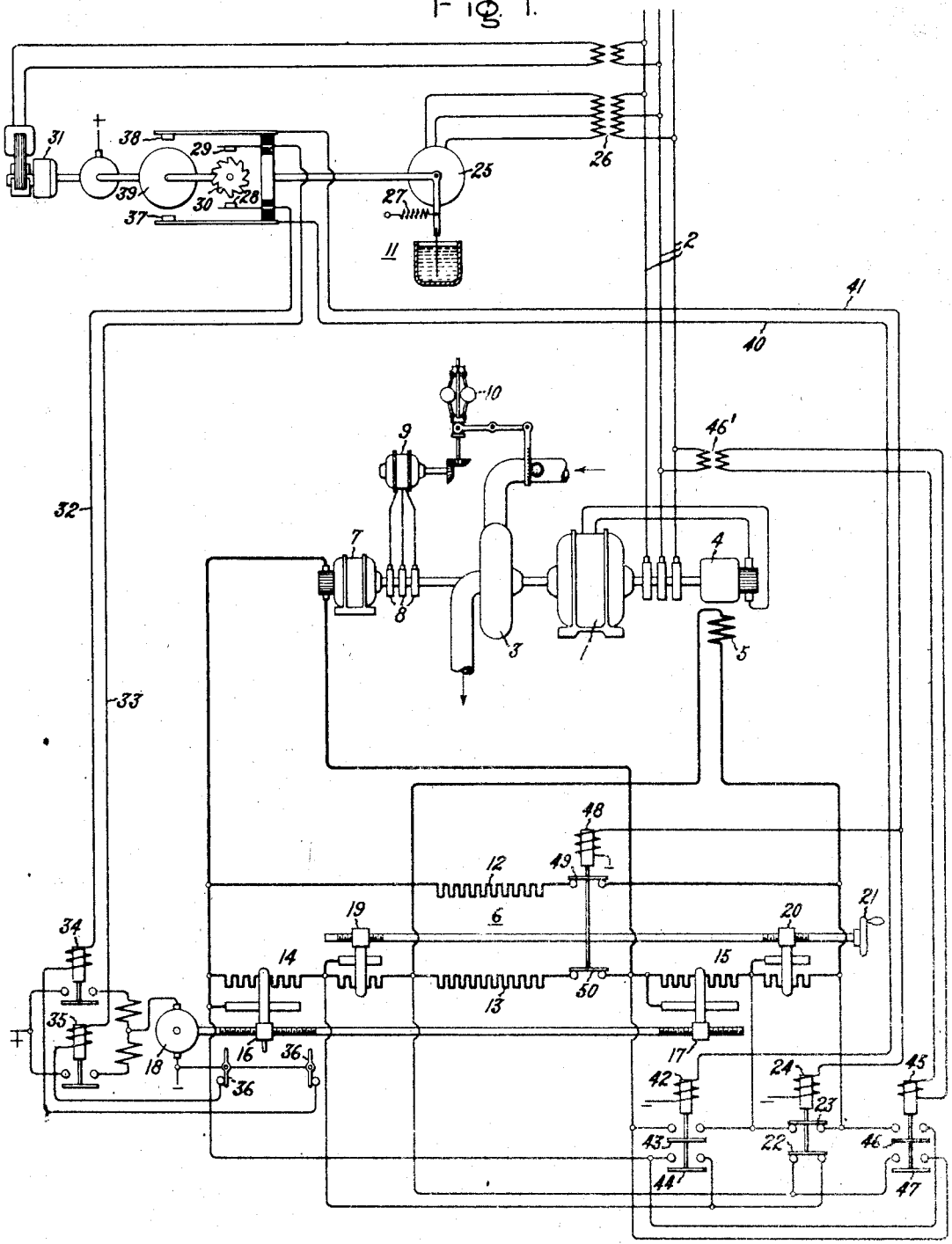

May 15, 1934.  F. A. HAMILTON, JR., ET AL  1,959,163
ELECTRICAL REGULATING SYSTEM
Filed Aug. 27, 1932  2 Sheets-Sheet 2

Inventors:
Francis A. Hamilton, Jr.
John B. McClure,
by Charles E. Tullar
Their Attorney.

Patented May 15, 1934

1,959,163

UNITED STATES PATENT OFFICE 1,959,163

ELECTRICAL REGULATING SYSTEM

Francis A. Hamilton, Jr., and John B. McClure, Schenectady, N. Y., assignors to General Electric Company, a corporation of New York Application August 27, 1932, Serial No. 630,706

10 Claims. (Cl. 290—40)

Our invention relates to electrical regulating systems and more particularly to such systems which employ Wheatstone bridge regulating resistances.

In Patent No. 1,894,837, granted January 17, 1933 on an application of Louis W. Thompson, and assigned to the assignee of the present application, there is disclosed and claimed a particular electrical regulator controlling a Wheatstone bridge regulating resistance. Our present invention deals with certain improvements in the control of Wheatstone bridge regulating resistances. These improvements, while applicable generally to Wheatstone bridge regulating resistances regardless of the kind of regulator by which they are controlled, are particularly adapted for use in connection with Wheatstone bridge regulating resistances which are controlled by the particular regulator which is disclosed in the above mentioned patent. That regulator is also disclosed in the present application.

A Wheatstone bridge regulating resistance consists of four electrical resistances connected in the form of a Wheatstone bridge. Between two electrically opposite terminals of the bridge a source of current is connected and between the other two terminals an element to be controlled is connected. This controlled element is usually the field winding of a dynamo-electric machine. When the bridge is balanced, that is to say, when all four arms have equal resistance, the effective resistance of the bridge is a maximum and is substantially infinite. By varying the resistance of any of the arms of a balanced bridge its effective resistance may be decreased. One way of reducing the effective resistance of a bridge, or in other words, of unbalancing the bridge, is simultaneously to reduce the resistance of two electrically opposite, or electrically non-adjacent, arms. By reducing the resistance of two such arms to zero the effective resistance of the bridge will be a minimum and will be substantially zero.

Wheatstone bridge regulating resistances have two characteristics which are taken account of in our invention. The first characteristic is that it is a relatively simple matter to reverse the polarity of a bridge or, in other words, to unbalance a bridge in the opposite direction. Thus, if the pair of electrically opposite arms which normally have the higher resistance are made to have the lower resistance, the bridge will be unbalanced in the opposite direction and the potential applied to the device controlled by the bridge will be reversed.

In accordance with one feature of our invention we utilize this characteristic to produce extremely rapid regulating action upon the occurrence of excessive values of an operating condition, which condition may or may not be the regulated condition. In the illustrated embodiments of our invention the regulated condition is the voltage of an alternating current generator and means is provided for automatically reversing the balance of the bridge upon the occurrence of excessive over-voltage so as to reverse the excitation of the generator and quickly reduce the voltage. When a synchronous generator suddenly loses load its terminal voltage quickly increases by an amount which is dependent upon the inherent voltage regulation of the machine, upon the amount and characteristics of the lost load, and upon the amount and characteristics of any load or loads which remain connected to the machine. Furthermore, owing to excess of mechanical input over electrical output, the machine accelerates, which tends to increase the terminal voltage by an additional amount which depends upon the resultant overspeed, upon the amount and characteristics of any load, or loads, remaining connected to the machine, and upon the characteristics and arrangement of the excitation system. Overvoltages, thus likely to be produced, may reach undesirable or even dangerous values, and schemes which limit the magnitude thereof are recognizably desirable.

It is broadly old in the above mentioned Thompson patent to reverse the balance of a Wheatstone bridge regulating resistance during the normal operation of the regulator which controls this resistance, but our invention differs therefrom in that it contemplates the use of auxiliary means responsive to excessive values of an operating condition for reversing the balance of the bridge to such an extent as to prevent more effectively undesirable or dangerous overvoltages.

The other characteristic of Wheatstone bridge regulating resistances with which our invention is concerned has to do with the rapid current changes which are produced in the source of current supply for the bridge when the effective resistance of the bridge resistance is quickly varied. This characteristic results from the fact that the time constant of the bridge energizing circuit is initially independent of the time constant of an inductive field winding which is controlled by the bridge, when the effective resistance of the bridge is suddenly changed. The magnitude of the extremely rapid current changes in the circuit which supplies the bridge is much greater when the bridge resistances are suddenly changed to reduce the current in the field winding controlled by the bridge. This is objectionable in cases where an exciter supplies the bridge and also supplies alternating current for driving a motor which in turn operates a speed governor. The reason for this is that the fast change in the exciter armature current, which occurs when the regulator acts to cause a change in the effective resistance of the bridge, causes a flux shift in the exciter with a corresponding voltage phase shift at the terminals of the speed governor motor. This causes severe mechanical shocks to the governor mechanism. In accordance with another feature of our invention we provide means for preventing too rapid changes of current in an exciter armature supplying a bridge as a result of changes in the effective resistance of bridge resistances.

An object of our invention is to provide a new and improved regulating arrangement employing a Wheatstone bridge regulating resistance.

Another object of our invention is to provide a new and improved regulating arrangement to limit over-voltages.

An additional object of our invention is to provide means for limiting the rate of change of current in the source of current supplying a Wheatstone bridge regulating resistance when the effective value of this resistance is varied.

A still further object of our invention is to provide a new and improved electrical regulating system.

Our invention will be better understood from the following description taken in connection with the accompanying drawings and their scope will be pointed out in the appended claims.

Figure 2:
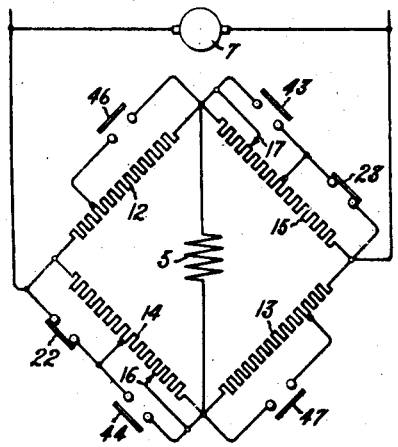
Figure 3:
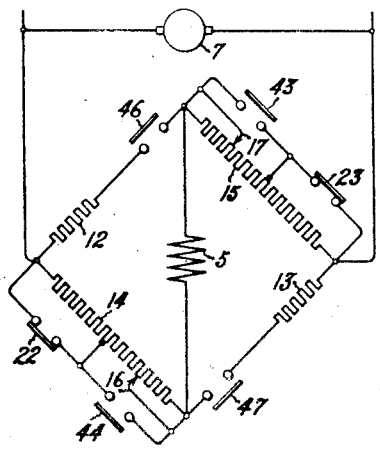
Figure 4:
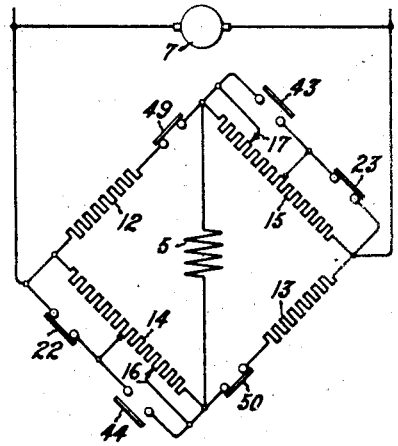
Figure 5:
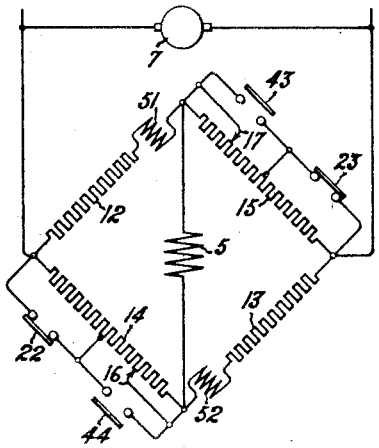

In the drawings, Fig. 1, is a diagrammatic illustration of an embodiment of our invention as applied to a particular regulating system which combines specific examples of the two features of our invention; Figs. 2 and 3 illustrate modifications of the feature for reversely unbalancing the bridge upon the occurrence of excessive values of an operating condition; while Figs. 4 and 5 illustrate modifications of the feature for limiting the rate of change of source current upon increases in the effective resistance of the Wheatstone bridge regulating resistance.

Referring now to Fig. 1 of the accompanying drawings, we have shown a main alternating current generator 1, shown as a three phase synchronous generator, connected to a three phase load circuit 2. Generator 1 is driven by any suitable prime mover such as turbine 3. An exciter 4 is provided for generator 1 and this exciter is provided with a field winding 5 which is energized through a Wheatstone bridge regulating resistance 6 from a pilot, or sub, exciter 7. Pilot exciter 7 is provided with slip rings 8 connected to symmetrically spaced points in its armature winding and the slip rings supply alternating current for operating a suitable motor 9 which drives a centrifugal governor 10 for controlling the speed of turbine 3. Such a governor drive is very simple and reliable and is being increasingly used in place of the well known belt drive.

The effective resistance of the Wheatstone bridge regulating resistance 6 is controlled by a regulator head 11.

The bridge 6 consists of four resistance arms 12, 13, 14 and 15, respectively. Arms 14 and 15 are the variable resistance arms which are controlled by the regulator head 11 and these arms are divided into two sections respectively. The left hand sections are controlled by rheostat mechanisms 16 and 17, respectively, which are operated in any suitable manner simultaneously by means of a suitable reversible pilot motor 18. The right hand sections of arms 14 and 15 are adjustable by means of rheostatic mechanisms 19 and 20, respectively, which are manually controlled simultaneously by means of suitable mechanism 21. These right hand sections of arms 14 and 15 are normally short circuited by contacts 22 and 23 of a high speed lowering contactor, or relay, 24, which is under the control of the regulator head 11.

Regulator head 11 comprises a torque motor 25 which is connected across circuit 2 by means of suitable potential transformer 26. Motor 25 produces a torque which varies in accordance with the voltage of circuit 2 and this torque is balanced by a spring, or other suitable restraining means, 27, so arranged that when normal voltage exists on circuit 2 the torque of motor 25 will be exactly neutralized by the torque of spring 27. Arranged so as to be movable by the motor 25 are relatively insulated low speed raise and lower contacts 28 and 29, respectively. These contacts cooperate with a center toothed contact wheel 30, which is mounted so as to be rotatable by any suitable means, such as by a small synchronous motor 31 connected to be energized from circuit 2. Wheel 30 is connected to the positive side of a suitable source of current supply and whenever contacts 28 or 29 are moved into engagement with contact wheel 30, conductors 32 or 33 will be energized and will operate low speed raise or lower contactors, or relays, 34 or 35 respectively. The circuits for operating these contactors are completed through limit switches 36, controlled by rheostatic mechanism 16, and then to the negative side of a suitable source of control current. Operation of either contactor 34 or 35 completes an energizing circuit for motor 18 through one or the other of a pair of reversing field windings on this motor, so that the direction of rotation of this motor is controlled depending upon which one of the contacts 34 or 35 is eenergized. Contacts 28 and 29 are resiliently mounted so that if sufficient torque is produced by motor 25, or by spring 27, these contacts will flex and will allow another set of contacts 37 or 38 to engage a center contact wheel 39 which is also operated by motor 31. The purpose of contact wheels 30 and 39 is to secure suitable antihunting, or intermittent, action of the regulator and also to secure an improved wiping contact action. Contact 37 is a high speed raise contact and contact 38 is a high speed lower contact and these contacts are connected respectively to conductors 40 and 41, which in turn serve to control the energization of a high speed raise contactor or relay 42 and the high speed lower contactor 24.

Briefly described, the operation of the automatic regulator is as follows: Assume that turbine 3 is operating in normal fashion and that the voltage of circuit 2 is normal. Under these circumstances the torque of motor 25 will be exactly balanced by the torque of spring 27 and none of the contacts 28, 29, 37 or 38 will engage their respective center wheel contacts. Consequently, motor 18 will be at rest and contactors 24 and 42 will be deenergized. Assume now that the voltage of circuit 2 falls slightly below normal. This will decrease the torque of motor 25 and spring 27 will cause low speed raise contact 28 to engage wheel contact 30. This will complete a circuit through conductor 32 for energizing low speed raise contactor 34 which will in turn complete an energizing circuit for motor 18 and will cause the motor to operate in such direction as to cause rheostatic means 16 and 17 to reduce the resistance of the left hand portions of bridge arms 14 and 15. This will reduce the effective resistance of bridge 6 and will increase the current through exciter field winding 5 and consequently will increase the excitation of main machine 1 and also its voltage. If the drop in voltage on circuit 2 is severe contact 28 will be flexed and contact 37 will engage contact 39 thereby completing a circuit through conductor 40 for high speed raise contactor 42. Energization of this contactor causes contacts 43 and 44 on it to short circuit the motor operated rheostatic sections of the arms 14 and 15 thereby greatly unbalancing the bridge and causing a relatively large increase in energization of field winding 5 and consequently a relatively large boost in excitation and voltage of the main machine. In a similar manner, if the voltage of circuit 2 rises above normal, contact 29 will engage contact 30 thereby completing an energizing circuit through conductor 33 for contactor 35 which will cause motor 18 to operate in the reverse direction to increase the resistance value of the left hand portions of resistance arms 14 and 15. This increase in resistance decreases the energization of field winding 5 and also decreases the excitation of the main machine, and consequently tends to return its voltage to normal. If the increase in voltage has been large the torque of motor 25 will be sufficient to flex contact arm 29 and allow high speed lowering contact 38 to engage its center contact 39. This will complete a circuit through conductor 41 for the high speed lower contactor 24. Energization of this contactor causes it to open its contacts 22 and 23, which will have the effect of inserting the right hand normally short circuited resistance portions of bridge arms 14 and 15. This will produce a relatively large and sudden decrease, or even a slight reversal, in energization of field winding 5 and consequently will tend quickly to reduce the voltage of circuit 2.

In order to provide for a greater reversal, and a correspondingly more rapid decrease of current in field winding 5, i. e. to prevent excessive over-voltages on circuit 2, we provide an auxiliary relay, or contactor, 45, connected to be responsive to the voltage of circuit 2, by means of a suitable potential transformer 46'. Relay 45 has normally open contacts 46 and 47 which when closed, are arranged to short circuit bridge arms 12 and 13, respectively. This has the effect of reversely unbalancing the bridge 6 and causing a reverse potential to be applied to field winding 5. This in turn will tend to reverse the potential of exciter 4 and thereby reverse the potential applied to the field winding of the main generator 1. Consequently, its voltage will be very quickly reduced whenever excessive overvoltages occur on circuit 2. It should, however, be understood that our invention is not limited in this respect to reversely unbalancing the bridge in response to excessive overvoltages and it will be obvious to those skilled in the art that relay 45 may be made to respond to any one of a number of excessive values of operating conditions of machine 1, or circuit 2, such as its current, power, speed, frequency, etc.

For preventing objectionable transient currents in the armature of sub-exciter 7 when the effective resistance of bridge 6 is increased relatively rapidly by the operation of the high speed lowering contactor 24, an auxiliary relay, or contactor, 48 is connected in parallel with the contactor 24. This contactor has contacts 49 and 50 which are in the arms 12 and 13 respectively of the bridge and which are arranged to open when contactor 48 is energized.

The operation of this feature is such that whenever the high speed lowering means of the regulating system is actuated the arms 12 and 13 of the bridge will be opened coincidentally with or before the opening of contacts 22 and 23 thereby making it necessary for the build down current of the exciter 7 to pass through the field winding 5 and consequently the time constant of this field winding will act to limit the rate of build down current, or the transient build down current, in the sub-exciter 7. This prevents injury to, or undesirable action of the governor mechanism 10 which would otherwise be produced by the flux phase shift in the sub-exciter 7, which would tend to cause sudden changes in the speed of motor 9.

Fig. 2 shows a modification in which the contactors 46 and 47 are connected so as to short circuit but a portion of the arms 12 and 13. This will sometimes be desirable in cases where it is not necessary to eliminate entirely the regulating resistances in circuit with the field 5 in order quickly to reduce the voltage in case of serious over voltage.

In the modification shown in Fig. 3 the arrangement, under normal operation, is strictly speaking, not a Wheatstone bridge. This is because the contacts 46 and 47 are connected in the arms 12 and 13 so that in normal operation these arms are open circuited and the regulating system is really a straight, or ordinary, regulating resistance in which the resistance is divided into two parts, 14 and 15, connected on opposite sides of the winding 5. However, upon the occurrence of over voltages, or any excessive values of an operating condition, the closure of contacts 46 and 47 will act to reverse the energization of field winding 5. Suitable resistances may or may not be connected in arms 12 and 13, as desired.

Fig. 4 shows in a simplified way the arrangement of Fig. 1 for reducing the build down rate of the current in the exciter armature 7. Thus, as shown in this figure, the contacts 49 and 50 are connected in the arms 12 and 13 and are operated by relay 48 to open these arms simultaneously with or ahead of the operation of contacts 22 and 23.

In the modification shown in Fig. 5 inductive reactances 51 and 52 are connected in series in arms 12 and 13, respectively. The effect of these reactances is to produce a suitable time constant in the armature circuit of the exciter 7. With the arrangement shown in Fig. 5 any change in resistance of arms 14 and 15 will produce a change in current in the armature 7 and this change in current must flow either in field winding 5 or in reactances 51 and 52 consequently the rate of change of this current will be controlled.

While we have shown and described particular embodiments of our invention, it will be obvious to those skilled in the art that additional changes, combinations, and modifications may be made without departing from our invention, and we therefore aim in the appended claims to cover all such changes and modifications as fall within the true spirit and scope of our invention.

What we claim as new and desire to secure by Letters Patent of the United States, is:

1. In combination, a Wheatstone bridge regulating resistance, an electric winding connected between electrically opposite terminals of said bridge, regulating means for varying the resistance of two electrically opposite arms of said bridge, and means responsive to an extreme value of an operating condition to be regulated for reducing the resistance of the other two arms of said bridge substantially below the resistances of the two first mentioned arms of said bridge.

2. In combination, a Wheatstone bridge regulating resistance, a dynamo-electric machine field winding connected between electrically opposite terminals of said bridge, regulating means for varying the resistance of two electrically opposite arms of said bridge, and means responsive to an extreme value of an operating condition for substantially short circuiting the other two arms of said bridge.

3. In combination, a series circuit including a dynamo-electric machine field winding, a pair of regulating resistances and a source of excitation for said field winding, said field winding being connected between said resistances, regulating means for varying the values of said resistances, and means responsive to an excessive value of an operating condition for reversely connecting said field winding to said source through relatively low resistance conductors.

4. In combination, a Wheatstone bridge regulating resistance, a dynamo-electric machine field winding connected between two electrically opposite terminals of said bridge, a source of current supply connected to the other two terminals of said bridge, means for varying the effective resistance of said bridge, and means for limiting the rate of change of the current in said source as a result of an effective change in the resistance of said bridge.

5. In combination, a Wheatstone bridge regulating resistance, an electric winding connected between electrically opposite terminals thereof, means for varying the resistance of one of the arms of said bridge, and means for open circuiting an electrically adjacent arm of said bridge.

6. In combination, a Wheatstone bridge regulating resistance, a dynamo-electric machine field winding connected between electrically opposite terminals of said bridge, and means for substantially simultaneously increasing the resistance of two electrically opposite arms of said bridge and open circuiting the other two arms of said bridge.

7. In combination, a Wheatstone bridge regulating resistance, a dynamo-electric machine field winding connected between electrically opposite terminals thereof, means for varying the electrical resistance of one of the arms of said bridge, and an inductive reactance connected in an adjacent arm of said bridge.

8. In combination, a Wheatstone bridge regulating resistance, a dynamo-electric machine field winding connected between electrically opposite terminals thereof, means for varying the electrical resistance of two of the electrically opposite arms of said bridge, and inductive reactances connected in the other two electrically opposite arms of said bridge.

9. In combination, a dynamo-electric machine field winding, an exciter therefor, a Wheatstone bridge regulating resistance connected between said winding and said exciter for controlling the current in said winding, a speed governor operating motor, slip rings on said exciter for providing means for energizing said motor, means for varying the effective resistance of said bridge, and means for reducing the rate of build down of the current in said exciter when the effective resistance of said bridge is increased.

10. In combination, an alternating current generator having a field winding, a turbine for driving said generator, a speed governor for said turbine, an alternating current motor for driving said governor, an exciter for said field winding, a sub-exciter synchronously driven with said generator for said exciter, slip rings on said sub-exciter for providing alternating current for driving said governor motor, a Wheatstone bridge regulating resistance for controlling the excitation of said exciter, an automatic voltage regulator for said generator for relatively quickly changing the resistance of two electrically opposite arms of said bridge, means operated by said regulator while it causes relative quick increases in the resistance of said arms for open circuiting the other two arms of said bridge, and means responsive to an excessively high generator voltage for short circuiting said other two arms.

FRANCIS A. HAMILTON, Jr.
JOHN B. McCLURE.